United States Patent Office 3,434,449
Patented Mar. 25, 1969

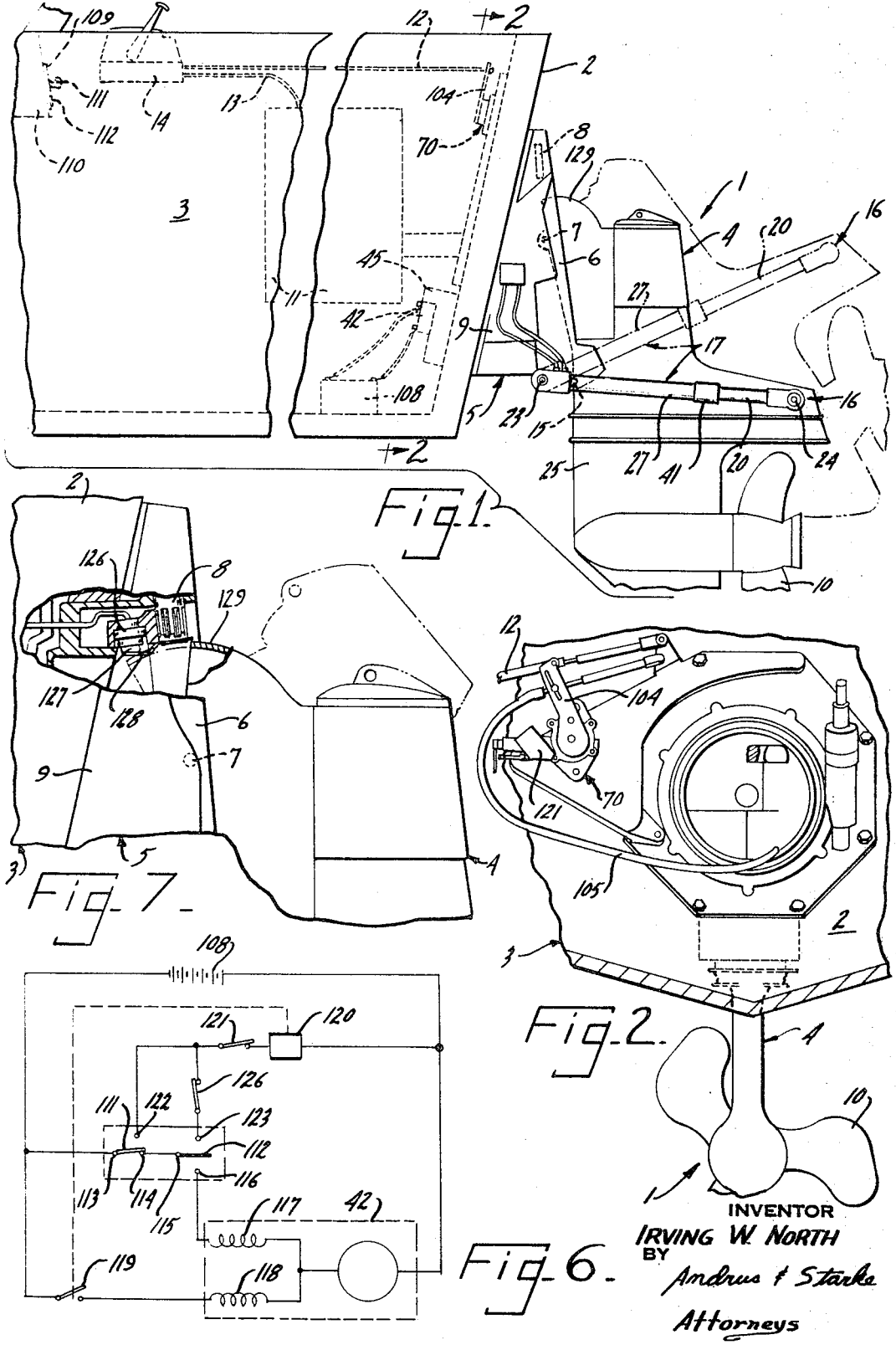

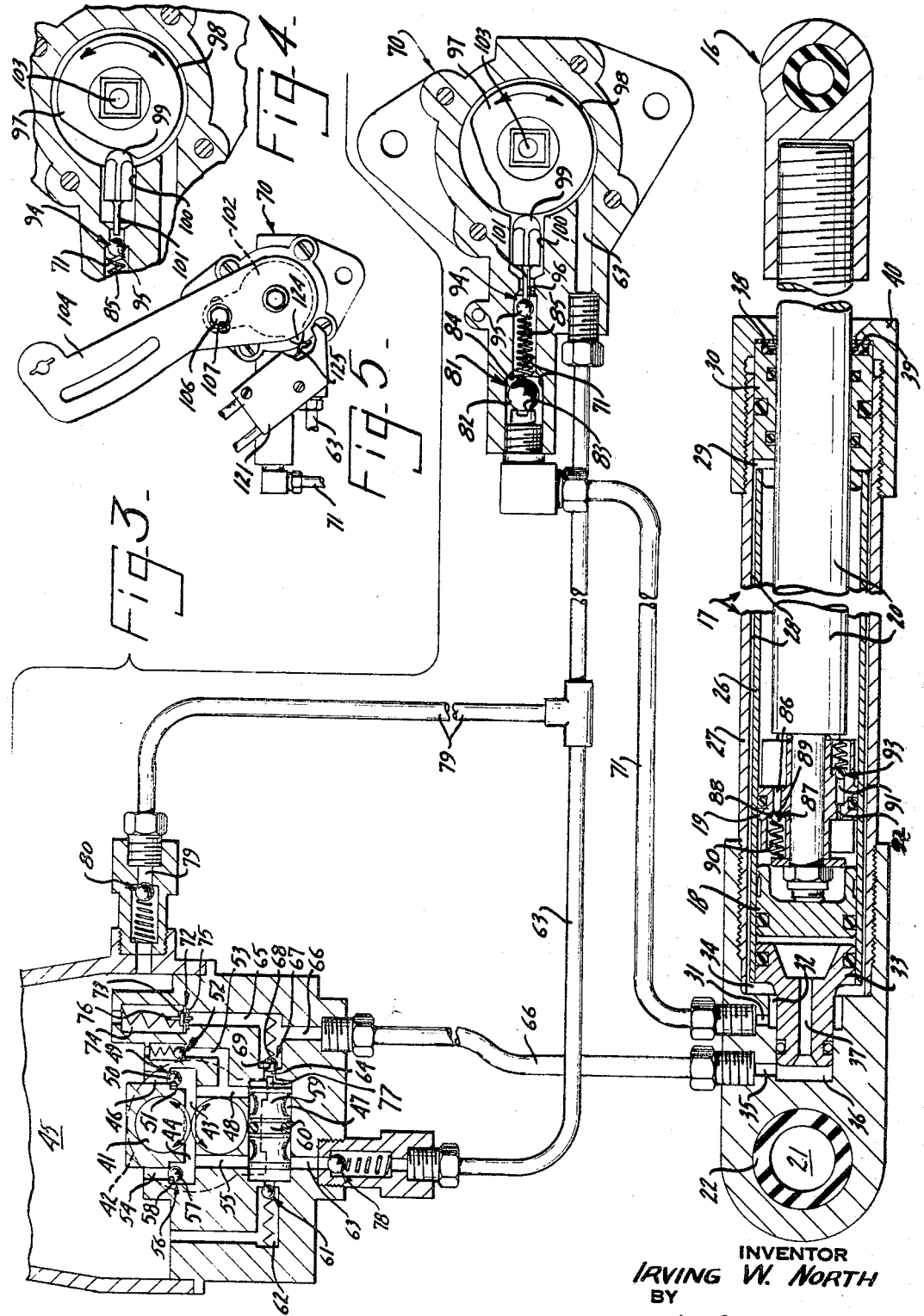

3,434,449
COMBINED IMPACT DAMPING AND POWER LIFT MECHANISM FOR AN OUTBOARD PROPULSION UNIT ASSEMBLY
Irving W. North, Neenah, Wis., assignor to Brunswick Corporation, Chicago, Ill., a corporation of Delaware
Filed Jan. 12, 1967, Ser. No. 608,934
Int. Cl. B63h 21/26, 5/14
U.S. Cl. 115—41      8 Claims

ABSTRACT OF THE DISCLOSURE

The hydraulic system includes a cylinder-piston assembly which extends between adjacent members pivoted relative to each other and which bridges the tilt axis of the outboard propulsion unit assembly. The system includes means for holding forward and reverse thrust of the drive member of the unit assembly and provides for power lifting of the drive member under certain conditions, power trimming of the drive member under certain conditions even while underway, and damping of the angular momentum imparted to the drive member upon impact with a submerged or floating object. Hydraulic lock means are incorporated in the system to preclude upward trimming or raising of the drive member when operating under reverse thrust conditions.

---

Several forms of combined impact damping and power lift mechanisms for outboard propulsion units are shown and described in Patents Nos. 3,003,724 and 3,285,221 which are assigned to the common assignee with this invention. It is generally an object of this invention to provide an improved hydraulic system for an outboard propulsion unit assembly which is adapted to hold forward and reverse propeller thrust of the drive member of the unit assembly and is capable of power lifting the drive member under certain conditions, power trimming the drive member under certain conditions, and damping the angular momentum imparted to the drive member upon impact with a submerged or floating object.

According to the invention, cylinder-piston means are interposed between and connect the adjacent members of an outboard propulsion unit assembly joined for relative pivotal movement in a generally vertical plane about the transverse horizontal tilt axis of the unit assembly. The cylinder-piston means includes a first floating piston for establishing the operating trim of the drive member of the unit assembly and a second piston connected to one of the adjacent members of the unit assembly. The first and second pistons generally move together when the drive member is raised or lowered under power. Upon impact of the drive member with a submerged or floating object, the first and second pistons separate with the floating piston substantially holding the given trim position and the second piston moving to damp the angular momentum imparted to the drive member. The invention further includes an hydraulic system for the cylinder-piston means for hydraulically locking the latter against extension when the drive member is operating under reverse propeller thrust conditions.

The drawings furnished herewith illustrate the best mode for carrying out the invention as presently contemplated and set forth hereinafter.

In the drawings:

FIGURE 1 is a side elevation of an inboard-outboard drive installation embodying the invention and shows the outboard or stern drive mounted on a partially shown watercraft in a given operating trim position and in phantom lines in an elevated or raised position;

FIG. 2 is a partial view taken generally on line 2—2 of FIG. 1 with parts broken away;

FIG. 3 is a schematic view of the hydraulic system of the invention providing for impact damping power trim adjustment and power lift for an outboard propulsion unit;

FIG. 4 is a partial detail view of the cam operated reverse lock check valve showing the cam and valve in position for reverse drive operation;

FIG. 5 is a detail view showing the mounting of the normally closed reverse lock switch which is shown actuated to the open position for reverse drive by the shift cable mechanism;

FIG. 6 is a schematic view of the electrical system for control of the hydraulic system shown in FIG. 3; and FIG. 7 is a detail view showing the mounting of the normally closed trim limit switch.

Referring to the drawings, an outboard propulsion unit assembly in the form of a stern drive 1 is shown mounted on the transom 2 of a partially shown watercraft 3. The stern drive includes the drive unit 4 and a bracket assembly 5 for supporting the drive unit from the transom 2. The bracket assembly 5 includes an intermediate member in the form of a gimbal ring 6 which pivotally supports the drive unit 1 upon a generally transverse horizontal axis 7 for tilt movement of the unit in a generally vertical plane. The gimbal ring 6 is in turn pivotally supported on a generally vertical axis 8 by the outer transom bracket 9 to provide for movement of the drive unit 4 in a generally horizontal plane for steering.

The drive unit 4 includes the propeller 10 which is drivingly connected to an engine 11 mounted inboard of the watercraft 3. The propeller 10 is selectively rotatable in opposed directions in accordance with operation of reversing gear means, not shown, to provide forward and reverse thrust respectively for the watercraft. The direction of rotation of propeller 10 as well as the engine throttle, not shown, are controlled through push-pull cables 12 and 13 respectively which are operatively connected to a control unit 14 mounted on watercraft 3 at a location convenient to the operator.

According to this invention, power means are provided for selectively moving the drive unit 4 about the tilt axis 7 between a lowermost position wherein the drive unit 4 engages with the stop pin 15 on the gimbal ring 6 and a full tilt position. The power means includes the extendable cylinder-piston means 16 forming a part of an hydraulic system and interposed between the drive unit 4 and the gimbal ring 6 to bridge the tilt axis 7. The cylinder-piston means 16 may be used for selectively raising and lowering the drive unit 4 and for selectively trimming the unit within a given range even while underway under forward thrust operating conditions and is further adapted to damp the angular momentum imparted to the drive unit upon impact with a submerged or floating object.

The cylinder-piston means 16 generally comprises the cylinder 17, a floating trim piston 18 within the cylinder, and the shock piston 19 telescopically received by the cylinder. The base end of cylinder 17 as well as the opposed end of rod 20 of piston 19 are provided with mounting eyes 21 which are lined with suitable annular resilient bushings 22. In the normal operating trim position of drive unit 4, the cylinder-piston means 16 is disposed generally horizontally as shown in FIG. 1 with the mounting eye of the cylinder 17 pivotally disposed on the pin 23 projecting outwardly from the lower portion of gimbal ring 6 and the mounting eye of the piston rod 20 pivotally disposed on the pin 24 projecting outwardly from the driveshaft housing 25 of drive unit 4. Disposed in this manner on the stern drive 1, the cylinder-piston means 16 generally parallel the propeller thrust forces even with steering movements of gimbal ring 6.

While in certain propulsion unit installations a single cylinder-piston means 16 may be adequate, two such means are preferred and are disposed on corresponding sides of drive unit 4 in transversely spaced relation. Since the two cylinder-piston means 16 are connected into the hydraulic system in such a manner that they will operate generally in unison and share substantially equally the loads imposed, reference will be made to but one of the two cylinder-piston means in the description which follows.

The cylinder 17 of the cylinder-piston means 16 generally comprises spaced inner and outer tubular members 26 and 27 providing an annular flow passage 28 therebetween. The flow passage 28 communicates with the cylinder portion behind the shock piston 19 through a plurality of suitable notches 29 provided in the cylinder end plug 30. The opposite end of the flow passage 28 communicates with line 31 in cylinder 17 through the annular passage 32 surrounding the reduced end portion of the guide member 33 for inner tubular member 26 and a plurality of suitable notches 34 in the shoulder of the guide member. The line 35 in cylinder 17 communicates with the cylinder portion ahead of the floating trim piston 18 via the connecting cylinder passage 36 and passage 37 extending axially through the guide member 33.

The floating trim piston 18 and shock piston 19 are slidable within and sealingly engage with the inner wall of the inner tubular member 26 of cylinder 17. The rod 20 of piston 19 extends axially and slidably through the cylinder end plug 30 which is sealingly engaged with the rod. An annular scraping element 38 is disposed in the end plug recess 39 in engagement with rod 20 and secured in place by the annular cylinder end cap 40 and serves to wipe the rod to preclude entry of deleterious foreign matter into the cylinder.

As shown in FIG. 3 the hydraulic system for operating the cylinder-piston means 16 includes the gear pump 41 which is driven by the reversible electric motor 42. The pump 41 communicates with the opposed lines 43 and 44 which serve as pump inlet and outlet selectively in accordance with the direction of pump operation. Line 43 is the pressure or outlet side of pump 41 and line 44 the suction or inlet side when the cylinder-piston means 16 is being pumped up to extend the means and thereby lift the drive unit 4. Conversely, line 44 is the pressure or outlet side of pump 41 and line 43 the suction or inlet side when the cylinder-piston means 16 is being pumped down to contract the means and thereby lower the drive unit 4.

The pump line 43 communicates respectively with the reservoir or sump 45 through the line 46 and the cylindrical shuttle piston chamber 47 through the line 48. A check valve 49 is disposed in sump line 46 and contains a loose ball 50 which is engageable with the closure seat 51 to close the sump line. When the pump 41 is operated to pump up and thereby extend the cylinder-piston means 16, the ball 50 is caused to engage the seat 51 to close sump line 46 and so divert all of the pumped fluid through the line 48 toward the chamber 47. Maximum pump up pressure is established or set by the check and regulating valve 52 disposed in line 53 connecting line 48 and the sump 45. When the pump 41 is idle or operating in the opposite direction, flow from the sump 45 through line 46 is freely permitted to prime and supply the pump.

Line 44 on the pump down side of pump 41 communicates respectively with the sump 45 through line 54 and the shuttle piston chamber 47 through the line 55 with the latter entering the opposite end of the chamber from the line 48. A check valve 56 similar to valve 49 is disposed in sump line 54 and includes the loose ball 57 engageable with the closure seat 58. The ball 57 engages the seat 58 in response to pump down pressure, but is otherwise removed from its seat to permit fluid to flow from the sump 45 through line 54 to prime and supply the pump.

A double spool-like shuttle piston member 59 is disposed in the chamber 47 and moves in opposed directions in accordance with the pump pressure acting thereon. The effective generally central piston portion 60 of member 59 is disposed intermediate the location of entry of the lines 48 and 55 into the chamber 47. Maximum pump down pressure is established or set by the check and regulating valve 61 disposed in line 62 connecting the corresponding end of chamber 47 and the sump 45. A pump down line 63 also opens from the corresponding end of chamber 47.

The end of shuttle piston chamber 47 oppositely from lines 62 and 63 opens into the pump up line 64 which in turn communicates respectively with the line 65 extending to the sump 45 and the line 66 extending to cylinder 17 where the latter is connected to the line 35. A check valve 67 is disposed in pump up line 64 and is adapted to normally prevent fluid flow from the line 66 into the shuttle piston chamber 47, but the spring biased ball 68 is easily forced from its seat 69 in response to the pump up pressure developed by pump 41 to provide for flow in the direction of the cylinder-piston means 16.

The pump down line 63 communicates with the reverse lock valve means 70, hereinafter described more fully, which in turn communicates with the cylinder-piston means 16 through the line 71 connected to the cylinder line 31 to complete the hydraulic circuit from the pump down side of pump 41 to the cylinder portion behind the shock piston 19.

To lift the drive unit 4, pump 41 is operated to pump up and the pressure developed moves or retains the shuttle piston member 59 in chamber 47 to the left as viewed in FIG. 3. After a given pump up pressure is developed, the ball 68 of check valve 67 is unseated to open the line 64 and provide for flow through the line 66 to the cylinder portion ahead of floating trim piston 18. Trim piston 18 and shock piston 19 are normally in contact with each other and move together in response to pump up pressure to extend the cylinder-piston means 16 and thereby lift the drive unit 4. When the drive unit 4 has been lifted or trimmed to the desired height and the pump 41 is stopped, the trim piston 18 is hydraulically locked against contraction of the cylinder-piston means 16 by closure of valve 67 in line 64 and by the safety relief valve 72 in line 65.

The safety relief valve 72 comprises a check and regulating valve wherein a piston member 73 is biased by a spring 74 in the direction countering pump up pressure. The seat 75 for valve 72 comprises a resilient washer which is compressed by the seated piston member 73 to force the washer into intimate sealing engagement with the forward projection 76 extending through the washer opening from member 73. Relief valve 72 is substantially leak proof and the biasing pressure of spring 74 must be adequate to hold against forward propeller thrust.

If the cylinder-piston means 16 is hydraulically locked against contraction with the drive unit 4 supported in a given raised position, it is necessary to relieve the pressure ahead of the trim piston 18 when lowering the drive unit. Such relief is provided by operation of the shuttle piston member 59 which carries a projection 77 adapted to enter line 64 and unseat the ball 68 of valve 67. When the pump 41 is operated in a direction to pump down, the back pressure generated in line 63 moves the shuttle piston member 59 to the right as viewed in FIG. 3 to open the line 64 and so provide for the flow of escaping fluid from ahead of the trim piston 18. With the pressure ahead of piston 18 relieved, the drive unit 4 will come down by gravity. However, after the escaping fluid from ahead of piston 18 forces closure of check valve 49, the capacity of gear pump 41 is such that it acts as a brake to slow down the flow of escaping fluid from ahead of piston 18 and thereby the downward travel of the drive unit 4 so that the unit will not outrun the pump which is simultaneously forcing fluid through lines 63 and 71 and into cylinder 17 behind the shock piston 19.

When the drive unit 4 has reached its new lower tilt position, the pump 41 is stopped to relieve the pressure on shuttle piston member 59 which during pump down maintained the line 64 open. With the removal of pump down pressure on shuttle piston member 59, the member is moved to the left as viewed in FIG. 3 within chamber 47 under the influence of the spring biased ball 68 in valve 67 which moves to reclose the line 64 and hydraulically relock the floating trim piston 18 against further movement into the cylinder 17 and contraction of the cylinder-piston means 16.

If for any reason, following a change in length of the cylinder-piston means 16 to raise or lower the drive unit 4, the cylinder portion behind the piston 19 as well as the several lines and passages communicating therewith are not solidly filled with fluid, additional fluid amounts are supplied from the sump 45 under atmospheric pressure through the lines 54 and 55 and chamber 47. Makeup fluid under atmospheric pressure as may be required for solid filling behind piston 19, passes through the relatively low pressure check valve 78 in line 63. While check valve 78 will pass the makeup fluid, it will normally prevent flow in the opposed direction.

With solid filling of cylinder 17 and related lines and passages behind the piston 19, it will be necessary to provide flow relief from behind the piston 19 during pump up to extend the cylinder-piston means 16 for lifting the drive unit 4. Such relief is provided for in the sump return line 79 which places the portion of line 63 behind the makeup check valve 78 in communication with sump 45 and contains the check valve 80. Check valve 80 in sump return line 79 is set to open in response to a given pressure to pass the escaping fluid from behind piston 19 during pump up operation and will normally prevent flow in the opposed direction out of the sump 45. The pressure in response to which check valve 80 will open is generally set high enough to prevent extension of the cylinder-piston means 16 and trail out or tilt movement upwardly of drive unit 4 except under conditions of impact of the unit with a submerged or floating object.

Upon impact of the drive unit 4 with a submerged or floating object while underway in the forward direction, the cylinder-piston means 16 is extended under the force of the impact and serves to damp the angular momentum of the upwardly swinging drive unit 4. Immediately following impact and as the cylinder-piston means 16 begins to extend, pressure builds up rapidly behind piston 19 and the fluid seeks escape. An initial rush or surge of fluid coursing line 71 from cylinder 17 closes the velocity check valve 81 comprising a ball 82 disposed between opposed seats 83 and 84. The valve ball 82 is normally biased by the spring 85 against the slotted seat 83 in which position the ball offers little or no interference to the flow of fluid in either direction. With a sudden rush of fluid from the cylinder, however, as occasioned by the sudden extension of the cylinder-piston means 16 resulting from impact of the drive unit 4 with an object, the ball 82 is forced from the seat 83 and moves onto the closure seat 84 against the pressure of spring 85 to trap the remaining fluid behind piston 19. The valve 81 will remain closed until the pressure behind piston 19 is relieved and the spring 85 is able to move the ball 82 from the closure seat 84.

With extension of the cylinder-piston means 16 following an impact of drive unit 4 with an object, the pistons 18 and 19 are caused to separate from each other with trim piston 18 remaining substantially in place and only shock piston 19 moving rearwardly relative to cylinder 17. Following the initial closure of line 71 by the velocity check valve 81, pressure continues to build up behind the rearwardly moving piston 19 until it reaches a given maximum. When the relatively high predetermined maximum pressure is attained behind piston 19, the fluid is relieved by flow into the cylinder portion between pistons 18 and 19 through one or more lines 86 which extend through the piston 19 and contain a one way check and regulating valve 87. The valve 87 comprises a ball 88 which is forced against the seat 89 by the relatively high biasing pressure of spring 90 which is considerably more than adequate to hold against reverse propeller thrust. The spring load on ball 88 of valve 87 is determinative of the kinetic energy in the pivoting drive unit 4 which is dissipated or absorbed and all or a substantial portion of that energy is removed as the cylinder-piston means 16 are extended. If the amount of kinetic energy in the pivoting drive unit 4 requires full extension of the cylinder-piston means 16 then the piston 19 serves to check the tilt movement of drive unit 4 by bottoming against the cylinder end plug 30.

The return swing of drive unit 4 on its tilt axis following an impact with a submerged or floating object is controlled by the return flow of fluid from the cylinder portion between the pistons 18 and 19 to the rod side of shock piston 19 through the one or more lines 91 extending through the shock piston. The rate of fluid flow through line 91 is controlled by an orifice restriction 92 in the line which limits the rate of return of the drive unit. Following the orifice restriction 92 in line 91, the returning fluid passes through a relatively low pressure check valve 93 which prevents fluid flow in the opposed direction.

When the drive unit 4 swings upwardly following impact, the quantity of fluid in the cylinder portion ahead of trim piston 18 remains substantially unchanged. As a result, when the drive unit 4 swings back down, it will return to substantially the same operating trim position held prior to the impact as the pistons 18 and 19 reestablish contact. Any fluid lost from behind piston 19 prior to closure of the velocity check valve 81 in line 71 immediately following impact, is replenished from sump 45 under atmospheric pressure which forces adequate fluid for solid refilling past the check valve 78 in line 63.

As best shown in FIGS. 3 and 4, the hydraulic system of this invention includes means to preclude upward power trimming or raising of drive unit 4 when the latter is operating under reverse propeller thrust conditions. The reverse lock valve means 70 interposed between the pump down lines 63 and 71 serves that function and includes the cam operated reverse lock check valve 94. Valve 94 comprises a ball 95 which is biased in the direction of the closure seat 96 by the spring 85 described hereinbefore for biasing the ball 82 of the velocity check valve 81 in the opposed direction. With seating of valve ball 95 fluid flow from the cylinder portion behind piston 19 is precluded and the cylinder-piston means 16 is hydraulically locked against extension. Contraction of the cylinder-piston means 16 to trim downwardly or lower the drive unit 4 is not prevented by the seating of valve ball 95 since the pump down pressure of pump 41 is well able to overcome the biasing pressure of the spring 85 and the pressure due to reverse propeller thrust.

The reverse lock valve means 70 further includes a cam 97 rotatable within a closed cam chamber 98 which communicates respectively with the pump down lines 63 and 71. The cam 97 controls the position of the plunger follower 99 slidably disposed in the enlarged end portion 100 of line 71 which opens into chamber 98. The plunger follower 99 is provided with a finned body so as not to interfere with the flow of fluid and includes a pilot projection 101 engageable with the ball 95 of the reverse lock check valve 94. When the reversing gear means, not shown, of drive unit 4 is disposed in neutral or in the forward drive operating position, the plunger follower 99 rides the high portion of cam 97 causing pilot projection 101 to hold the valve ball 95 off from its seat 96 to assure free flow of fluid through valve 94 as generally shown in FIG. 3. When the reversing gear means of drive unit 4 is disposed in the reverse operating drive position, the low portion of cam 97 is in alignment with the plunger follower 99 which is biased in the direction of the cam by spring 85 which simultaneously seats the valve ball 95 to effect closure of valve 94 as generally shown in FIG. 4.

The cam 97 is actuated by the lever 102 which is mounted on the cam shaft 103 externally of chamber 98. Lever 102 is secured to the intermediate shift lever 104 which is pivoted coaxially with the cam shaft 103 and is actuated by the control unit 14 through the push-pull cable 12. The lever 104 in turn actuates the reversing gear means, not shown, through the push-pull cable 105. The forward drive, reverse drive and neutral positions respectively of lever 104 are imparted to cam 97 by lever 102.

To assure that the several drive positions of cam 97 are properly synchronized with the corresponding positions of lever 104, adjustability is provided between the levers 102 and 104. The securement means 106 carried by lever 102 extends through an arcuate slot 107 in lever 104. The slot 107 is disposed on a radius from the common axis of levers 102 and 104 and provides for relative pivotal movement therebetween when the securement means 106 have been loosened. After proper synchronization is attained between cam 97 and lever 104, the securement means 106 are tightened and the levers 102 and 104 move together as one.

The reversible motor 42 for operating the pump 41 is powered by the battery 108 as shown in FIG. 6. A control panel 109 for motor 42 is mounted at the dashboard 110 of watercraft 3 convenient to the operator and includes a key switch 111 and a rocker switch 112.

The rocker switch 112 is rendered effective to control motor 42 when the key switch 111 is actuated to close across contacts 113 and 114 disposed in series with the rocker switch as generally shown in FIG. 6. With the key switch 111 closed across contacts 113 and 114, the rocker switch 112 is selectively operable to close the parallel motor circuits for pumping up and pumping down operation of pump 41 under conditions as hereinafter further described.

To lower the drive unit 4 from any given raised or elevated position to any desired lower position by contraction of the cylinder-piston means 16 with pump down operation of pump 41, the rocker switch 112 is actuated to close across contacts 115 and 116 completing the circuit through the pump down windings 117 of motor 42. The switch 112 is held closed across contacts 115 and 116 until the desired lower position of drive unit 4 is reached, following which switch 112 is released to stop the motor 42 and pump down operation of pump 41. After switch 112 is released, it is biased to an inoperative position as shown in FIG. 6 by a spring, not shown. The rocker switch 112 may be used to lower drive unit 4 even while the watercraft 3 is underway.

The circuit through the pump up windings 118 of motor 42 is completed by closure of switch 119 which is actuated by the solenoid 120 disposed in a parallel circuit from switch 119. The solenoid 120 may be energized to close switch 119 under certain conditions by operation of the key switch 111 or the rocker switch 112.

Actuation of key switch 111 for pump up is recommended only when the watercraft 3 is not underway or is proceeding slowly in shallow waters in the forward direction. With key switch actuation for pump up, the drive unit 4 may be lifted by extension of the cylinder-piston means 16 to any position up to its maximum lift position.

Both the key switch 111 and rocker switch 112 are rendered effective for pump up only when the reversing gear means of the drive unit 4 are in neutral or forward drive position. This condition for pump up by operation of switches 111 and 112 is imposed by the normally closed reverse interlock switch 121 disposed in series with the key switch pump up contacts 113 and 122 and with the rocker switch pump up contacts 115 and 123. The reverse inter-lock switch 121 is located adjacent to the cam actuating lever 102 which includes a switch actuating projection 124. In the neutral and forward drive positions of cam actuating lever 102, the projection 124 remains out of contact with the switch arm 125 of switch 121 to render the key switch 111 and rocker switch 112 effective for pump up and extension of the cylinder-piston means 16. In the reverse drive position of the cam actuating lever 102, the switch actuating projection 124 on lever 102 engages with the switch arm 125 and thereby opens the reverse inter-lock switch 121 as generally shown in FIG. 5 to preclude extension of the cylinder-piston means 16.

Assuming the reversing gear means of drive unit 4 to be in neutral or forward drive position so that the reverse interlock switch 121 remains closed, then closure of the key switch 111 across the pump up contacts 113 and 122 will complete the rocker switch by-pass circuit through the solenoid 120. So long as the solenoid 120 remains energized by closure across the key switch contacts 113 and 122, the pump up windings 118 of motor 42 remain energized to drive pump 41 to lift the drive unit 4 to a desired new lift position by extension of the cylinder-piston means 16. After the drive unit 4 has been raised to the new lift position, the key for switch 111 is released and a spring, not shown, biases the switch to reclose across contacts 113 and 114 as generally shown in FIG. 6. With the key switch 111 closed across contacts 113 and 114, the rocker switch 112 is again rendered effective to lower drive unit 4.

The rocker switch 112 is rendered effective for pump up and extension of the cylinder-piston means 16 only in the neutral and forward drive positions of the reversing gear means of drive unit 4 as conditioned by the reverse inter-lock switch 121 described hereinbefore and only within a limited trimming range of drive unit 4 as conditioned by the normally closed limit switch 126. For pump up trimming extension of the cylinder-piston means 16 the rocker switch 112 is closed across contacts 115 and 123. If the reversing gear means of drive unit 4 is in neutral or forward drive position and the reverse interlock switch 121 closed, then the normally closed trimming limit switch 126, also connected in series with the rocker switch pump up contacts 115 and 123, controls the pump up trimming range for the rocker switch. The trimming limit switch 126 is mounted on the gimbal ring 6 of the stern drive 1 and includes a depressible switch button 127 as generally shown in FIG. 7. A spring lever 128 extends across the switch button 127 and is pushed upwardly to depress the button and thereby open switch 126 by the drive unit bell housing 129 when the drive unit reaches the maximum upward trimming position.

Assuming closure of key switch 111 across contacts 113 and 114, and that the reversing gear means of drive unit 4 is in neutral or forward drive position so that the reverse interlock switch 121 is closed, and that the drive unit is disposed within the limited trimming range so that the trimming limit switch 126 is also closed, then closure across the rocker switch contacts 115 and 123 will complete the circuit through solenoid 120 to close switch 119 to operate the pump 41 to pump up and thereby extend the cylinder-piston means 16 to lift the drive unit to a new trim position. After the new trim position of drive unit 4 is reached, the rocker switch 112 is released and biased to the inoperative position shown in FIG. 6 by a spring, not shown. If the new trim position of drive unit 4 remains within the trimming range of rocker switch 112, then the rocker switch may be used for still further upward trimming or for downward trimming of the drive unit as desired.

I claim:

1. In combination with an outboard propulsion unit for watercraft, said unit having a first support member secured to the watercraft, an intermediate support member pivotally mounted on the first support member about a first axis, and a drive member pivotally mounted on the intermediate support member about a second axis generally normal to the first axis, one of said axes being generally vertical to provide for steering movement of the drive member in a generally horizontal plane and the other of said axes being transverse horizontal to provide for tilt movement of the drive member in a generally vertical plane; hydraulic means to pivot the drive member about the tilt axis and including an extendible cylinder-piston assembly interposed between and connecting the adjacent members pivotally connected at the tilt axis and bridging the tilt axis, said cylinder-piston assembly comprising a cylinder pivotally connected to one of the adjacent members, a first piston telescopically received by the cylinder and pivotally connected to the other of the adjacent members, a second piston slidably disposed in the cylinder ahead of said first piston, said second piston being normally engaged by the first piston to establish the operating trim for the drive member, first and second line means provided in said first piston placing the cylinder portion behind said first piston in communication with the cylinder portion between said first and second piston, one-way valve means in the first line means of said first piston adapted to hold as against reverse propeller thrust and to open with movement of said first piston relative to the cylinder following an impact of said drive member with a submerged or floating object to provide for escape of fluid from the cylinder portion behind the first piston to the cylinder portion between the pistons to thereby damp the angular momentum of the upwardly tilting drive member, and means in the second line means to preclude fluid flow from the cylinder portion behind the first piston to the cylinder portion between the pistons and to restrict the return flow of fluid from the cylinder portion between the pistons to the cylinder portion behind the first piston to control the return movement of the drive member following impact, said first and second pistons separating upon impact of the drive member with a submerged or floating object with the second piston remaining substantially in place to reestablish the original operating trim position for the drive member upon reengagement of the first and second pistons.

2. The invention as set forth in claim 1 wherein the hydraulic means includes a source of fluid under pressure, a first line means placing the fluid source in communication with the cylinder portion behind the first piston, and a second line means placing the fluid source in communication with the cylinder portion ahead of the second piston, said fluid source being adapted to selectively supply the respective cylinder portions to move said pistons relative to the cylinder and thereby telescopingly actuate the cylinder-piston assembly to pivot the drive member correspondingly.

3. In combination with an outboard propulsion unit for watercraft, said unit having a first support member secured to the watercraft, an intermediate support member pivotally mounted on the first support member about a first axis, and a drive member pivotally mounted on the intermediate support member about a second axis generally normal to the first axis and having reversing gear means operable by control means, one of said axes being generally vertical to provide for steering movement of the drive member in a generally horizontal plane and the other of said axes being transverse horizontal to provide for tilt movement of the drive member in a generally vertical plane; hydraulic means to pivot the drive member about the tilt axis and including an extending cylinder-piston assembly interposed between and connecting the adjacent members pivotally connected at the tilt axis and bridging the tilt axis, said cylinder-piston assembly comprising a cylinder pivotally connected to one of the adjacent members, a first piston telescopically received by the cylinder and pivotally connected to the other of the adjacent members, a second piston slidably disposed in the cylinder ahead of said first piston, said second piston being normally engaged by the first piston, to establish the operating trim for the drive member, a source of fluid under pressure, a first line means placing the fluid source in communication with the cylinder portion behind the first piston, and a second line means placing the fluid source in communication with the cylinder portion ahead of the second piston, said fluid source being adapted to selectively supply the respective cylinder portions to move said piston relative to the cylinder and thereby telescopingly actuate the cylinder-piston assembly to pivot the drive member correspondingly, said first line means placing the fluid source in communication with the cylinder portion behind the first piston including one-way valve means adapted to hydraulically lock the fluid behind the first piston and thereby prevent extension of the cylinder-piston assembly when the drive member is operated under reverse propeller thrust conditions, and means to open said one-way valve means in the neutral and forward drive positions of the drive member.

4. The invention as set forth in claim 3 wherein the means to open the one-way valve means comprises cam means operable by the control means for actuating the reversing gear means of the drive member.

5. In combination with an outboard propulsion unit for watercraft, said unit having a first support member for securement to the watercraft, an intermediate support member pivotally mounted on the first support member about a first axis, and a drive member pivotally mounted on the intermediate support member about a second axis generally normal to the first axis, one of said axes being generally vertical to provide for steering movement of the drive member in a generally horizontal plane and the other of said axes being transverse horizontal to provide for tilt movement of the drive member in a generally vertical plane; an hydraulic system providing for powered movement of the drive member about the tilt axis and including an extendible cylinder-piston assembly interposed between and connecting the adjacent members pivotally connected at the tilt axis and bridging the tilt axis, said cylinder-piston assembly comprising a cylinder pivotally connected to one of the adjacent members, a first piston telescopically received by the cylinder and pivotally connected to the other of the adjacent members, and a second piston slidably disposed in the cylinder ahead of said first piston; said hydraulic system further including a fluid source, a pump communicating with said fluid source, reversible drive means for selectively driving the pump in opposed directions to pump up and pump down respectively, pump up line means placing the pump in communication with the cylinder portion ahead of the second piston, pump down line means placing the pump in communication with the cylinder portion behind the first piston, valve means in the pump up line means to hydraulically lock the cylinder-piston assembly against contraction and adapted to open in response to a given pump up pressure to provide for fluid passage to the cylinder portion ahead of the second piston to extend the cylinder-piston assembly and thereby lift the drive member, fluid source return line means placing the cylinder portion behind the first piston in communication with the fluid source and having one-way valve means to provide for escape of the fluid from the cylinder portion behind the first piston when the pump is operated to pump up, means operable in response to pump down pressure to open the valve means in the pump up line means to provide for escape of fluid from the cylinder portion ahead of the second piston with simultaneous passage of fluid to the cylinder portion behind the first piston to contract the cylinder-piston assembly and thereby lower the drive member, and velocity check valve means in the pump down line means to close said line means in response to the rapid flow of fluid from the means in response to the rapid flow of fluid from the cylinder portion behind the first piston due to sudden extension of the cylinder-piston assembly following an impact of the drive member with a submerged or floating object to substantially prevent passage of fluid to the fluid source.

6. In combination with an outboard propulsion unit for watercraft, said unit having a first support member for securement to the watercraft, an intermediate support member pivotally mounted on the first support member about a first axis, and a drive member pivotally mounted on the intermediate support member about a second axis generally normal to the first axis and having reversing gear means operable by control means, one of said axes being generally vertical to provide for steering movement of the drive member in a generally horizontal plane and the other of said axes being transverse horizontal to provide for tilt movement of the drive member in a generally vertical plane; an hydraulic system providing for powered movement of the drive member about the tilt axis and including an extendible cylinder-piston assembly interposed between and connecting the adjacent members pivotally connected at the tilt axis and bridging the tilt axis, said cylinder-piston assembly comprising a cylinder pivotally connected to one of the adjacent members, a first piston telescopically received by the cylinder and pivotally connected to the other of the adjacent members, and a second piston slidably disposed in the cylinder ahead of said first piston; said hydraulic system further including a fluid source, a pump communicating with said fluid source, reversible drive means for selectively driving the pump in opposed directions to pump up and pump down respectively, pump up line means placing the pump in communication with the cylinder portion ahead of the second piston, pump down line means placing the pump in communication with the cylinder portion behind the first piston, valve means in the pump up line means to hydraulically lock the cylinder-piston assembly against contraction and adapted to open in response to a given pump up pressure to provide for fluid passage to the cylinder portion ahead of the second piston to extend the cylinder-piston assembly and thereby lift the drive member, fluid source return line means placing the cylinder portion behind the first piston in communication with the fluid source and having one-way valve means to provide for escape of the fluid from the cylinder portion behind the first piston when the pump is operated to pump up, means operable in response to pump down pressure to open the valve means in the pump up line means to provide for escape of fluid from the cylinder portion ahead of the second piston with simultaneous passage of fluid to the cylinder portion behind the first piston to contract the cylinder-piston assembly and thereby lower the drive member, and valve means disposed in the pump down line means to hydraulically lock the fluid behind the first piston and thereby prevent extension of the cylinder-piston assembly when the drive member is operated under reverse propeller thrust conditions, and means to open the valve means in said pump down line means in the neutral and forward drive positions of the drive member.

7. The invention as set forth in claim 6 wherein the means to open the valve means in said pump down line comprises cam means operable by the control means for actuating the reversing gear means of the drive member.

8. In an hydraulic system for use in an outboard propulsion unit having a transverse horizontal tilt axis about which a drive member is adapted to pivot in a generally vertical plane, said hydraulic system being adapted to damp the angular momentum of the upwardly tilting drive member following an impact of the drive member with a submerged or floating object and to selectively pivot the drive member about the tilt axis; said hydraulic system comprising a cylinder-piston assembly adapted for connection to the adjacent members of the propulsion unit joined for relative pivotal movement at the tilt axis whereby said assembly bridges said axis, said cylinder-piston assembly including a cylinder pivotally connected to one of the adjacent members and a first piston telescopically received by the cylinder and pivotally connected to the other of the adjacent members and a second piston slidably disposed in the cylinder ahead of the first piston, said second piston being normally engaged by the first piston to establish the operating trim for the drive member; a source of fluid under pressure; a first line means placing the fluid source in communication with the cylinder portion behind the first piston; a second line means placing the fluid source in communication with the cylinder portion ahead of the second piston, said fluid source being adapted to selectively supply the respective cylinder portions to move said pistons relative to the cylinder and thereby telescopingly actuate the cylinder-piston assembly to pivot the drive member correspondingly; said first piston having first and second line means placing the cylinder portion behind said first piston in communication with the cylinder portion between said first and second piston, valve means in the first line means of said first piston adapted to hold as against reverse propeller thrust and to open with movement of said first piston relative to he cylinder following an impact of said drive member with a submerged or floating object to provide for escape of fluid from the cylinder portion behind the first piston to the cylinder portion between the pistons to thereby damp the angular momentum of the upwardly tilting drive member, and valve means in the second line of said first piston to preclude fluid flow from the cylinder portion behind the first piston to the cylinder portion between the pistons and to restrict the return flow of fluid from the cylinder portion between the pistons to the cylinder portion behind the first piston to control the return movement of the drive member following impact, said first and second pistons separating upon impact of the drive member with a submerged or floating object with the second piston remaining substantially in place to reestablish the original operating trim position for the drive member upon reengagement of the first and second pistons.

References Cited

UNITED STATES PATENTS

| | | | |
|---|---|---|---|
| 2,596,471 | 5/1952 | Densmore et al. | 91—170 X |
| 2,755,766 | 7/1956 | Wanzer | 115—35 |
| 3,053,489 | 9/1962 | Robinson et al. | 115—41 X |
| 3,164,959 | 1/1965 | Gondek | 91—420 |
| 3,274,902 | 9/1966 | Kleckner | 91—420 |

TRYGVE M. BLIX, *Primary Examiner.*

U.S. Cl. X.R.

91—170